Oct. 9, 1934.   C. H. WHITE   1,976,314
PLANTER MECHANISM
Filed Dec. 19, 1929   4 Sheets-Sheet 4
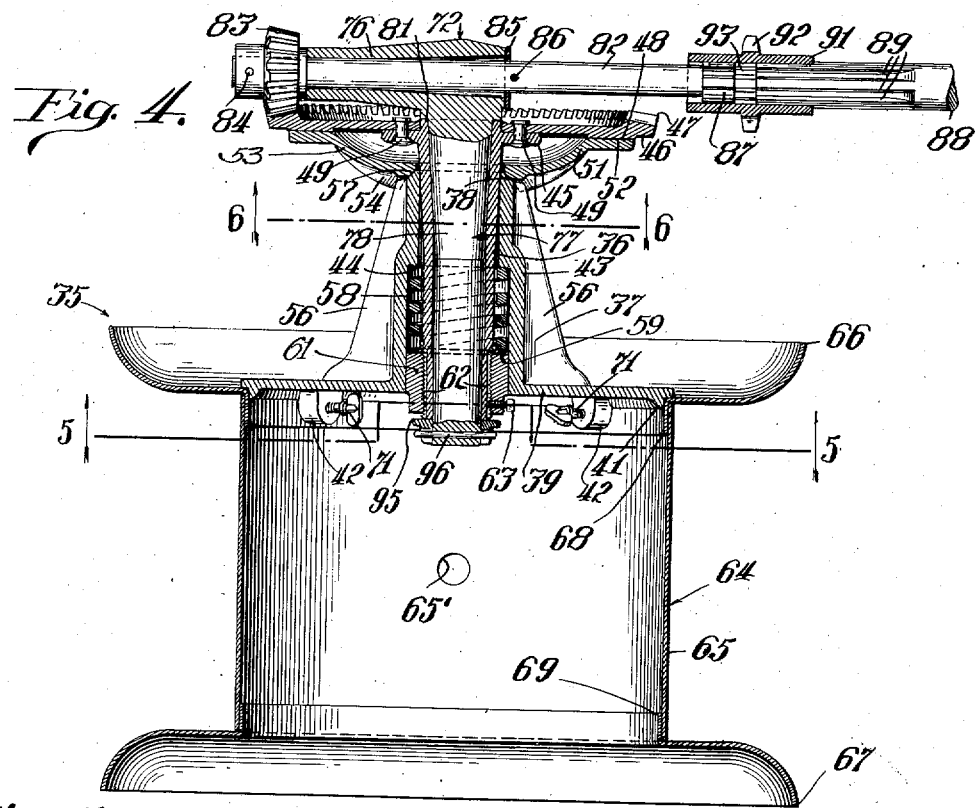
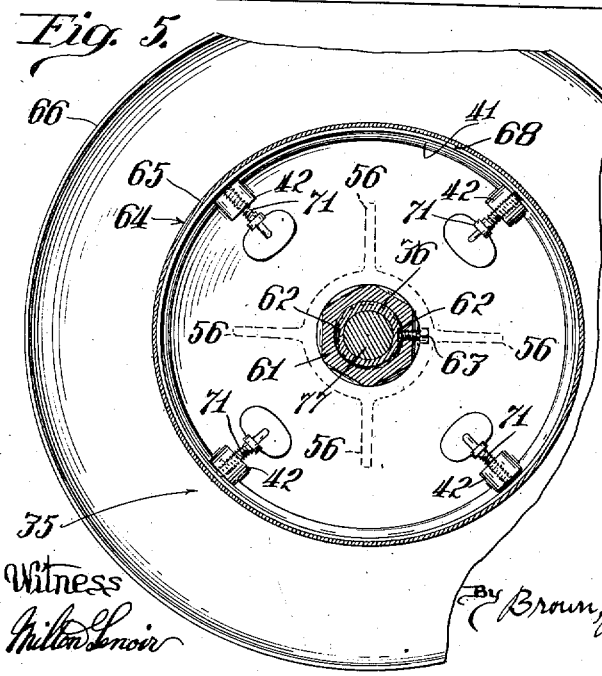
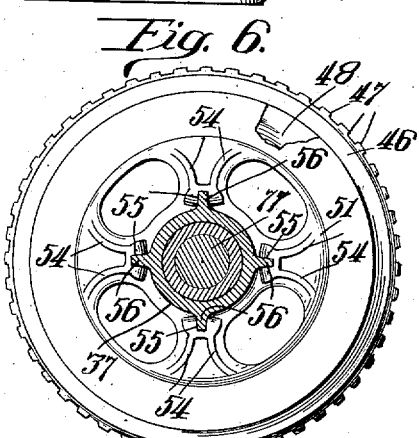
Inventor
Charles H. White Patented Oct. 9, 1934

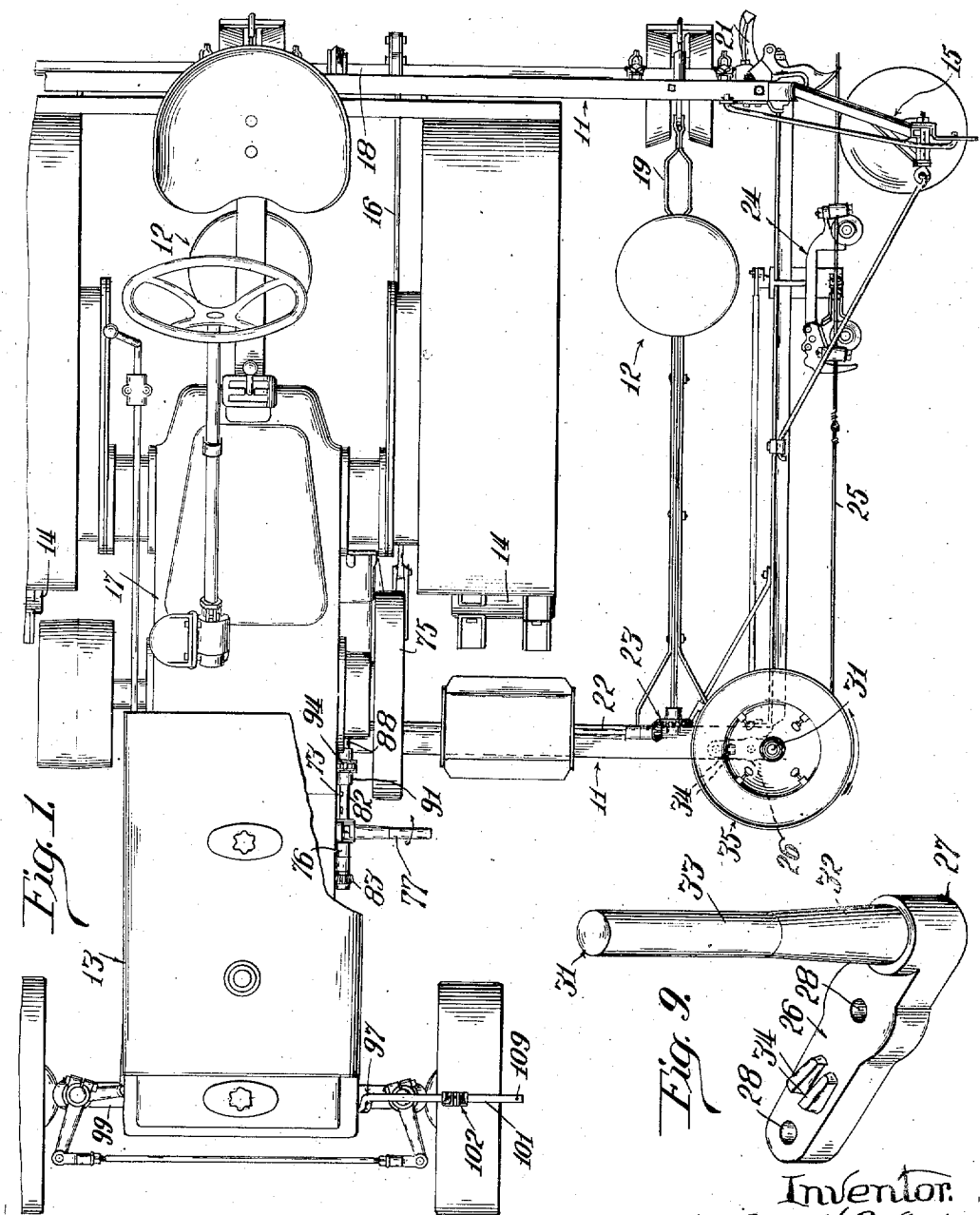

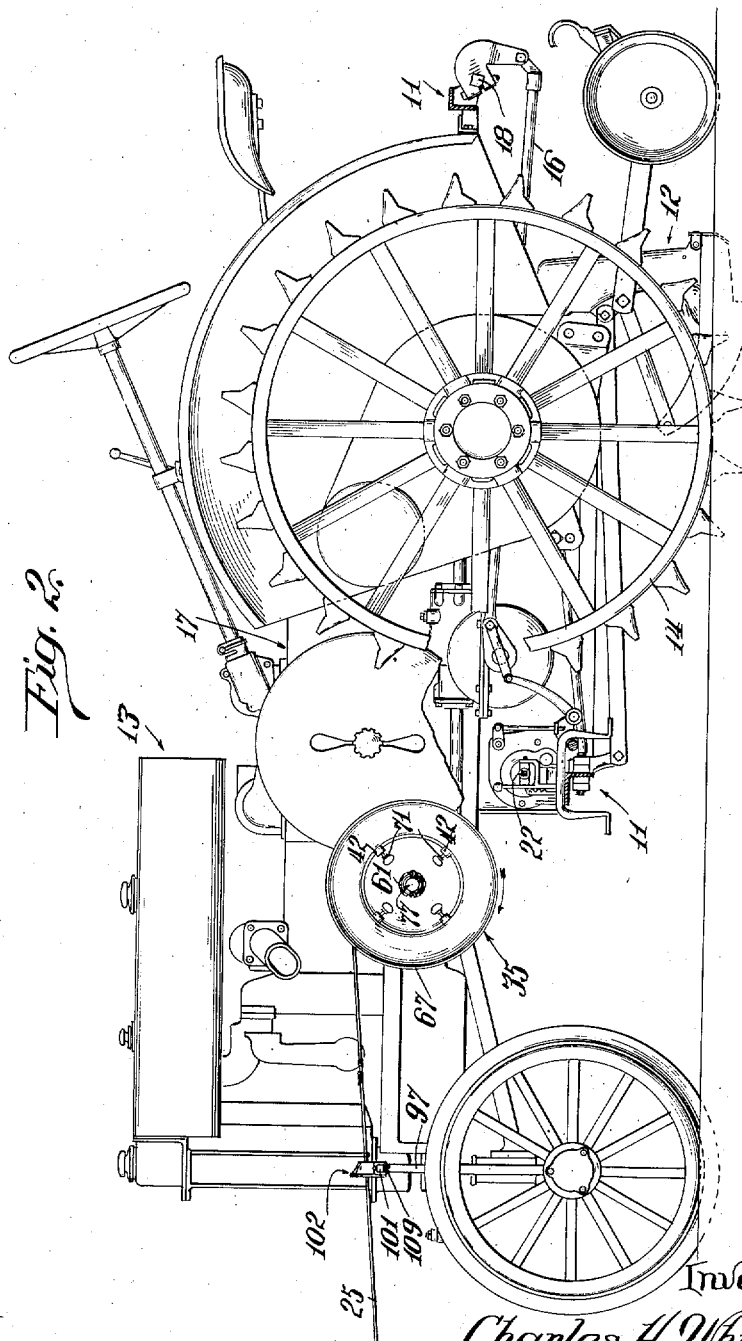

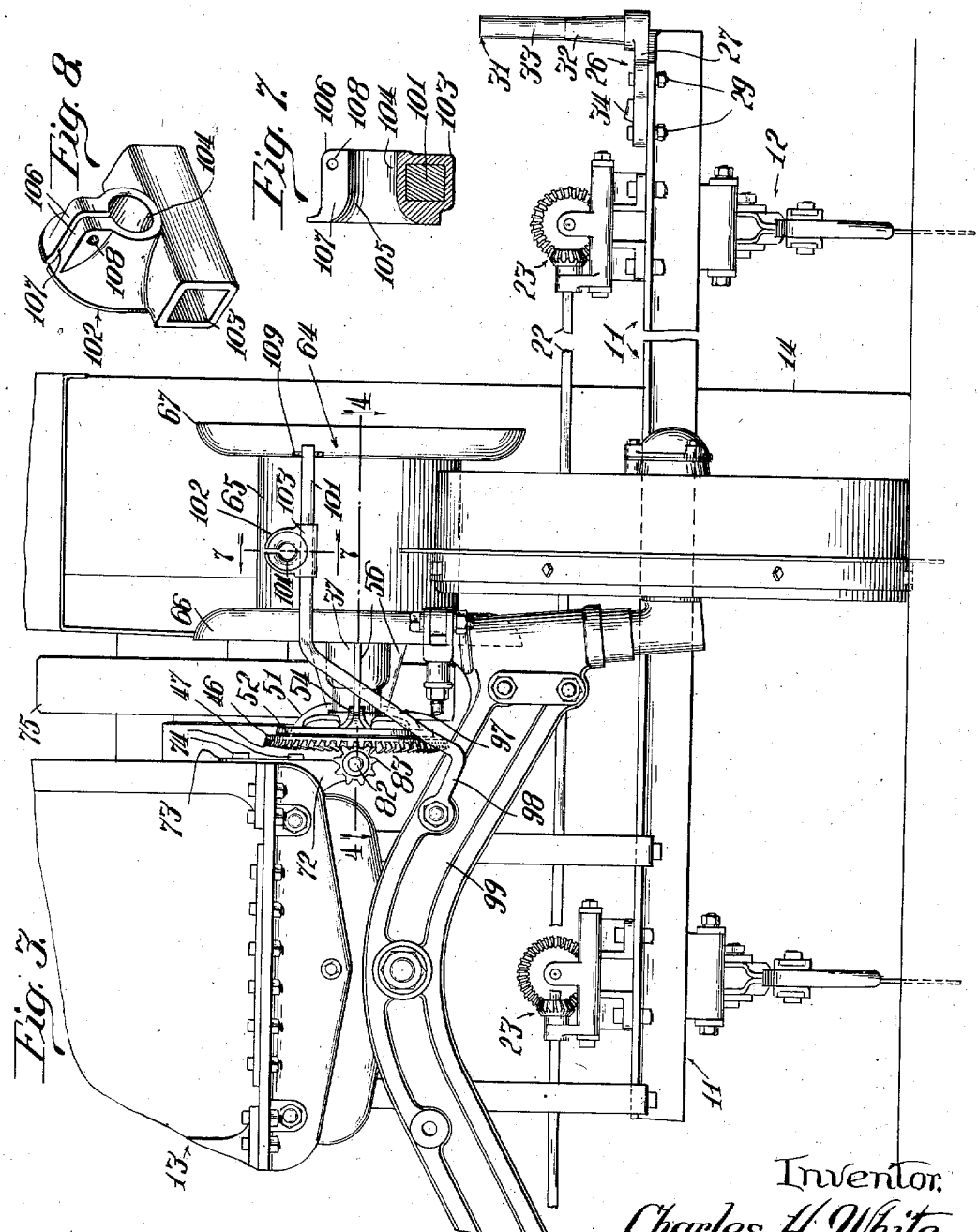

1,976,314

UNITED STATES PATENT OFFICE 1,976,314

PLANTER MECHANISM

Charles H. White, Moline, Ill., assignor to Deere & Company, Moline, Ill., a corporation of Illinois Application December 19, 1929, Serial No. 415,221

5 Claims. (Cl. 242—91)

This invention relates to planter mechanism of the check-row planter type and more particularly to check-wire reeling mechanism therefor, and mounting means for such reels to aid in unreeling and reeling the wire, as particularly adapted for a tractor planter of the type disclosed in my copending application for Tractor planter, Serial No. 220,472, filed September 19, 1927, now Patent No. 1,943,778, issued Jan. 16, 1934.

Heretofore, in check-row planting, it has been the custom generally to first lay out the wire, stake the end thereof, and to then proceed with the planting operation. This means that one trip must be made across the entire length of the field solely for the purpose of laying the wire before the actual planting operation can be started. It is evident from the foregoing, that in large fields, particularly where the planting is done longitudinally of relatively long fields, considerable time is lost in the operation of initially laying out the check-wire. Furthermore, inasmuch as no provision has heretofore been made in these reeling devices for tension adjustment of the check-wire in unreeling operations, some difficulty has been encountered in the unreeling of the wire, resulting in inaccuracy in cross checking.

One of the main objects of this invention is the provision of a novel reel mechanism, and reeling and unreeling mechanism, whereby the first set of rows adjacent to the boundary of a field may be planted and the check-wire concurrently laid out on the first trip across the field. Since tractor planters are now more and more coming into extensive use, it is desirable to have a mounting for the unreeling operation such as will aid in the quick, accurate, and ready laying out of the wire by its coaction with the check-row head. To this end, I have provided a mounting member at the forward corner of the planter frame, so that the reel may be in such a position relative to the check-row head, that the wire will be drawn in a direction parallel with the longitudinal edge of the planter frame, and in alignment with the check-row head.

Another object is the provision of a reel support on each side of the planter frame so that the check-wire may be unreeled and laid out from either side of the planter, depending on which side edge of the field is first planted. As the exigencies of each field may require, it may be desirable to unreel from either side of the tractor planter, with the tractor headed in the same direction. Accordingly, a reel support is provided at either side of the planter frame, whereby unreeling and concurrent planting may be accomplished from either side of the planter.

A further object is the provision of reel mechanism supports having means thereon adapted to cooperate with the reel mechanism in such a manner as to aid in maintaining tension on the check-wire in reeling and unreeling.

Another object is the provision of a novel reel mechanism wherein, by coaction with a cooperating element on the reel supports, a substantially constant tension may be maintained on the check-wire in reeling and unreeling. By the provision of a novel slippage clutch on the reel mechanism a uniform tension can be maintained on the check-wire as it is unreeled through the check-head. The slippage clutch further prevents overrunning or free floating of the reel in the event the check-wire should be jerked in the laying out operation as the check-row buttons of the check-wire are passing through the check-head, thus avoiding sudden spinning of the reel and a consequent release of a length of check-wire which might become entangled or caught. In addition, the slippage clutch, by its retarding action, simulates the normal tension of the check-wire in staked condition, thus maintaining the same accuracy in unreeling and concurrent planting as in subsequent normal planting of the succeeding rows.

In the reeling operation the slippage clutch compensates for the variance between the peripheral speed of the reel drum of the reel mechanism and the slower speed of the tractor, so that a uniform tension is maintained on the check-wire resulting in a uniformly wound reel.

A further object is the provision of a tension adjusting means for the reel slippage clutch, thus permitting the employment of any desired tension upon the check-wire in both unreeling and reeling.

Another object is the provision of a novel means for the reel drum on the reel mechanism whereby the reel drum may quickly and easily be reversed on the reel mechanism for right-hand or left-hand mounting on the planter frame. In unreeling, in order to unreel the check-wire in as near a line parallel to the longitudinal edge of the planter frame as is possible and in alignment with the check-head, it is desirable to mount the reel mechanism so that the check-wire will unreel at a tangent to the outer side of the reeled wire. Thus in unreeling from the right-hand side of the planter, the reel drum is in an inverted position from that when unreeling from the left side of the planter, and vice versa. In order to mount the reel drum on the reel mechanism quickly and easily in one or the other position and to permit of ready reversibility of the reel drum, a novel reel drum securing means has been provided on the reel mechanism so that the reversal may be readily accomplished by simply loosening a series of annularly positioned thumb screws normally engaging the inner periphery of the reel drum, turning the reel drum end for end, and subsequently tightening the thumb screws against the inner periphery of the reel drum at the opposite end thereof.

A further object is to provide a reel mechanism support and power take-off connection to such support whereby the reeling operation may be performed by power transmitted to the reel mechanism by the power plant of the tractor as the wire is wound up after completing the planting in one dimension of the field. Due to the slippage clutch provided in the reel mechanism, as hereinbefore stated, tension is provided on the check-wire so that the wire may be tightly reeled on the drum, the tractor moving forwardly slower than the normal rotation of the reel mechanism.

Another object is the provision of a novel check-wire guide and support therefor for the reeling operation, the distribution of the wire on the reel being controlled by simply guiding the tractor to the right or left in placing the wire to one side or the other on the reel.

Other and further objects will appear from the following detailed description of a preferred embodiment of my invention illustrated in the accompanying drawings, in which:

Figure 1 is a fragmentary plan view of a tractor planter showing the planter mounted upon a tractor with the reel mechanism mounted on the frame in unreeling position;

Figure 2 is a side elevation of the tractor planter illustrating the reel mechanism in reeling position, with the planter frame illustrated in section, the view being taken along a line parallel to the tractor axis adjacent to the rear tractor wheel illustrated in Figure 1;

Figure 3 is a fragmentary front elevation of the tractor planter illustrating the reel mechanism in reeling position on the tractor, the reeling check-wire guide, and the planter frame reeling mechanism support for the unreeling mounting of the reel mechanism;

Figure 4 is a section of the reel mechanism in reeling position taken along the line 4—4 of Figure 3 and showing a portion of the power take-off connection for driving the reel;

Figure 5 is a fragmentary section taken along the line 5—5 of Figure 4;

Figure 6 is a fragmentary section taken along the line 6—6 of Figure 4;

Figure 7 is a section of the check-wire guide for the reeling operation taken along the line 7—7 of Figure 3;

Figure 8 is a perspective view of the check-wire guide for the reeling operation; and Figure 9 is a perspective view of the planter frame reel mechanism support.

In Figure 1 I have illustrated a fragmentary portion of a tractor planter of the type disclosed in my copending application above noted and which comprises primarily a frame 11 supporting power operated planter units 12, the planter frame being so mounted on the tractor 13 that the rear wheels 14 of the tractor are disposed within the planter frame 11 with two of the planter units positioned between each tractor wheel and the outer side edge of the frame and a third unit positioned between the wheels 14. While I have illustrated only a portion of the planter frame, it will be understood that the side of the planter mechanism not shown is similar to the side shown and has only been omitted to simplify the disclosure of the instant invention.

A marker device 15 of the type disclosed in my prior Patent No. 1,911,218, issued May 30, 1933, is mounted for vertical pivotal motion at each rear corner of the planter frame. The marker arms and planter units are each power operated to raised and lowered positions by a power linkage connection 16 from the power plant 17 operating through a rock-shaft 18 mounted in suitable bearings, along the rear frame portion, each planter unit being connected to the rock-shaft by a link 19 and each marker device being operated by the engagement therewith of a cam 21 carried by the rock-shaft. The seed feeding devices of the planter units are each power operated from the power plant 17 by a suitably connected shaft 22 mounted in suitable bearings along the front frame portion and operating through bevel gear connections 23 with shafts leading back to the planter units. Each side frame member carries suitably secured thereto in proximity to a line connecting the planter units, a check-head 24 preferably provided with a wire doffing mechanism of the type disclosed in my prior Patent No. 1,805,506, issued May 19, 1931. Since the above described features independently form no part of the present invention, they will be only generally referred to hereinafter.

In order to permit of unreeling of the check-wire 25 for laying out and to concurrently permit of planting of the first set of rows, I have provided at each front frame corner, reel mounting supports in the form of brackets 26 each comprising a base portion 27 having longitudinally spaced apart holes 28 adapted for the passage therethrough of securing means such as bolts 29 to secure the brackets to the front frame member.

One end of the bracket base 27 has projecting perpendicularly therefrom a spindle 31 having an upwardly tapering, frusto-conical portion 32 adjacent to the base portion and a cylindrical portion 33 at its upper end. The base portion 27 is further provided with fixed members in the form of a pair of sloping projections 34, simulating beveled gear teeth arranged in arcuate spaced apart relation, with the axis of the spindle as a center. The purpose and function of the projections 34 will be hereinafter described. These brackets 26 are so positioned on the frame with respect to the check-heads 24 that with the reel mechanism 35, which will be hereinafter described, in position on one of the brackets the check-wire 25 can be unreeled through the adjacent check-head 24, with the wire unreeling from the outer side of the reel and in a line approximately in the normal line of travel of the wire through the check-head.

I shall now describe my novel reel mechanism 35, reference being had particularly to Figures 4, 5 and 6. The reel mechanism 35 is mounted upon a supporting member comprising a bearing 36, the inner periphery of which conforms generally to the periphery of the spindle 31. The bearing 36 is rotatably mounted upon a reel hub 37, one end of which is beveled as indicated at 38. The other end of the hub is provided with an integral disc portion 39, having a circular flange 41 projecting from its outer face and spaced radially inwardly from the periphery thereof.

A series of circumferentially disposed lugs 42, the axis of each of which is radially disposed, project outwardly from the face of the disc 39, with the outer ends thereof flush with the outer periphery of the flange 41. For substantially half of the length of the reel hub, the hub is formed with an enlarged portion 43, the inner bore of which is larger than that of the remainder of the hub, providing an inner annular seat 44, the purpose of which will be hereinafter explained. One end of the bearing 36 is provided with a peripheral flange 45 spaced inwardly from the end of the bearing, forming a seat for a reel bevel gear 46 having radially disposed bevel teeth 47 on its outer face and a clutch face 48 on its inner face. The bevel gear 46 is secured to the flange 45 by means of circumferentially disposed, transverse rivets 49, the central portion of the gear 46 being provided with a recess for seating the gear on the end of the bearing. Concentrically disposed and loosely mounted on the bearing 36 adjacent to the bevel gear 46 is a friction disc 51 having a friction flange 52 and a concavo-convex central portion 53, which is disposed in spaced relation to the bearing flange 45. The convex side of the friction disc 51 is provided with outwardly extending, radially disposed ribs 54 provided at their inner ends with seats 55.

The ends of integral reinforcing ribs 56 provided longitudinally of the reel hub 37 are seated in the seats 55 of the friction disc with the beveled end 38 of the hub engaging an angularly disposed surface 57 on the friction disc 51. A coil spring 58 is seated in the enlarged portion 43 of the hub 37 with its innermost end seated on the annular seat 44 and being coiled about the bearing member 36. A washer 59, abutting the outer end of spring 58, is retained by a hexagonally crowned nut 61 adapted to thread on the end of the bearing member 36. Diametrically opposed, longitudinally extending grooves 62 are provided on the bearing member, extending across the threads thereof, and are adapted to selectively receive a machine set screw 63 threaded radially in the crown of the nut 61. It will be evident that by releasing the set screw 63 and rotating the nut 61, the pressure of the spring 58 may be varied, thus varying the pressure exerted by the friction plate 51 against the clutch face 48 of the gear 46 through the hub 37. The reel drum 64 comprises a central tubular portion 65 having similarly flared end flanges 66 and 67 suitably secured thereto at each end, the flanges having circular extensions 68 and 69, respectively, seated in and abutting the inner periphery of the tubular portion 65. A recess 65' is provided in the portion 65 for receiving and retaining one end of the check wire. Radially disposed thumb screws 71, threaded through lugs 42 on the flange 39 with their heads disposed inwardly toward the center of the hub, are adapted to selectively engage either flange 68 or 69 of the reel drum to retain the drum on the reel mechanism. Since the reel drum is symmetrical, it will be evident that the drum 64 is reversible end for end as regards the mounting of the drum upon the flange 39 of the hub 37.

Referring particularly to Figures 1 and 4 in the unreeling and concurrent planting operation of the first three rows, the reel mechanism 35 is mounted on the spindle 31 of the bracket 26 with the reel 64 uppermost and the hub portion 37 thereunder. In this position of the reel mechanism, the projections 34 are adapted to engage teeth 47 of the bevel gear 46 of the reel mechanism. By adjusting the nut 61, the tension of spring 58 may be increased or decreased, thereby adjusting the friction between the friction plate 51 and the coacting friction surface 48 of the gear 46. Reel 64 is then mounted upon the hub flange 39 and secured by the set screws 71 so that the check-wire 25 will unwind from the reel from the outer side thereof. Check-wire 25 is then positioned in the check-head 24 and through the fork thereof, and the end of the check-wire is then staked to the ground at the end of the field. As the tractor is moved down the field, it will be evident that as the check-wire is being laid out the planters will be operated under the control of the check-wire and the first three rows of the field planted concurrently with the laying out of the wire. Since the gear 46 remains stationary due to the engagement of the teeth 47 thereof with the projections 34 of the reel support 26, a tension will be imposed upon the check-wire due to the frictional engagement of the friction member 51 with the friction face 48 of the gear 46. As the friction between these two elements of the reel mechanism is constant and uniform, the tension of the check-wire 25 will likewise be uniform.

While the reel mechanism is shown in Figure 1 as being mounted on the left side of the planter frame, it will be evident that, if the tractor is to be moved across the other end of the field or in the opposite direction, the reel mechanism may be mounted upon a similar mounting bracket provided at the right side of the tractor planter frame. For unreeling in this latter position all that need be done is to reverse the reel 64 end for end upon the flange 39 of the reel hub 37. Thus the check-wire may be unreeled and the first three rows of the field concurrently planted from either side of the tractor planter frame, the change from its position on one side of the planter frame to the other involving merely a shifting of the reel hub from one mounting to the other and a reversal of the reel drum end for end. The latter may, of course, be easily and readily accomplished by a mere loosening of the thumb screws 71 for removal of the reel drum from the hub flange 39 and by a tightening thereof against the inner periphery of the reel drum in reversed position.

Referring now particularly to Figures 1, 3 and 4, I shall describe the reeling mount and operating connections associated therewith for taking up the check-wire upon the reel drum upon completion of the planting. A support in the form of a supporting bracket 72 having a supporting or base flange 73 is suitably secured, as by bolts 74, upon the left frame member of the chassis frame of the tractor 13 adjacent the power plant thereof and in advance of the fly wheel 75.

Bracket 72 is provided with a tapered journal portion 76 with the narrower portion thereof extending forwardly. Extending radially from the larger end of the journal portion 76 and outwardly from the bracket base 73 is a spindle 77, comprising a frusto-conical or tapered portion 78 which extends from the journal portion 76 outwardly to a point substantially midway of the spindle 77, the remainder of the spindle 77 being cylindrical in shape. The base of the spindle 77 is provided with an annular shoulder 81 against which the inner end of the bearing portion 36 of the reel hub 37 is adapted to seat. Journaled in the bearing portion of the journal 76 is a shaft 82 horizontally positioned and having at its forward end a bevel pinion 83 suitably secured to the shaft 82 as by a pin 84 or some other suitable means. The inner end of the pinion 83 is adapted to bear against the narrower end of the journal portion 78 and, in cooperation with a washer 85 bearing against the wider end of the journal portion 76 and a pin 86 extending through the shaft and bearing against the washer 85, is adapted to retain the shaft 82 in the journal portion 76 of the mounting bracket 72. Shaft 82 extends rearwardly of the journal portion 76 and is provided at its rear end with a gear portion 87. A horizontally disposed power take-off shaft 88, provided at its forward end with splines 89, is connected to shaft 82 by a sleeve 91, the outer periphery of which is provided with a sprocket 92 and the inner periphery of which is provided with splines 93. Splines 89 are of sufficient length to permit the sleeve 91 to be slid back therealong so that the sleeve may be disconnected from the gear 87 of the shaft 82. The power take-off shaft 88 is adapted to be driven from the engine of the tractor, as is well understood. The sprocket 92 may be connected through a chain with another sprocket driving the seed feeding mechanism of the planter unit, such forming no part of the present invention.

Referring particularly to Figure 4, when it is desired to take up the check-wire, the reel hub 37 with its appurtenant clutch disc 51 and gear 46 is mounted upon the spindle 77 and retained in position thereupon by a castellated washer 95 positioned on the end of the spindle 77 with the smooth face thereof in engagement with the end of the bearing portion 36 and retained thereon by a diametrically disposed pin 96 passing through the spindle 77 and through diametrically opposed slots in the crown of the washer. The reel drum 64 may then be mounted on the hub flange 39 and secured thereto by the thumb screws 71.

In order that the check-wire may approach the reel drum without interference from the steering wheel and steering connections at the forward end of the tractor, I have provided a check-wire guide positioned thereabove. This guide comprises a polygonal supporting rod 97 having an offset portion 98 provided at its end with a recess through which a bolt is adapted to pass to secure the rod 97 to the front axle 99 of the tractor. The other end of rod 97 is provided with a horizontally extending portion 101 of a length slightly greater than that of the cylindrical portion 65 of the drum 64. A guide bracket 102 having a polygonal bearing portion 103 at its lower portion is slidably positioned on the horizontal portion 101 of the rod 97, the latter extending through the polygonal bearing portion 103. The upper portion of the bracket 102 is provided with a transverse bore 104, the axis of which is perpendicularly disposed relative to the axis of the polygonal bearing portion 103, the bore 104 being positioned above said bearing portion. The forward portion of the bore 104 is flared outwardly as indicated at 105.

A pair of flanges 106 defining a longitudinally disposed slot 107 communicating with the bore 104 are formed integrally with the upper flared portion of the bracket 102 and at their rear portions are provided with transversely aligned holes 108. With the guide bracket 102 slidably positioned on the horizontal portion 101 of the rod 97, a cotter pin 109 extending transversely through the rod adjacent the outer end thereof is adapted to retain the bracket 102 from displacement at this end of the rod.

With the reel mechanism 35 in position on the reeling supporting bracket 72, as shown in Figures 2, 3 and 4, the teeth 47 of gear 46 are meshed with the pinion 83. The shaft 82 is normally rotated at such a speed that if the reel drum were rigidly secured to the gear 46, the peripheral speed of the reel drum 64 would normally be greater than the longitudinal or forward speed of the tractor. Inasmuch as the end of the check-wire 25 is staked at the end of the field, it will be evident that with the difference in speed, as above pointed out, the stake at the end of the field would either be uprooted or the check-wire broken by undue strain imposed thereupon. However, by the provision of the slippage clutch arrangement, with the spring 58 compressed to produce the desired friction, a uniform pull is exerted on the check-wire 25. Furthermore, due to the uniform tension imposed upon the check-wire in the reeling operation, a uniformly wound drum results. As the tractor is propelled down the field in reeling, it may be driven in a somewhat zigzag course so that the wire upon the drum will be distributed uniformly over the periphery of the central portion 65 of the drum. During this zigzagging movement of the tractor the bracket 102 is adapted to move along the horizontal portion 101 of the supporting rod 97, thereby accommodating itself to the angular dispositions of the check-wire in reeling.

The longitudinally disposed slot 107 of the bracket 102 permits the insertion of the check-wire for sliding movement through the bore 104 or removal thereof from the bore 104, as desired. With the check-wire in the bore 104, a pin may be inserted through the aligned recesses 108 to prevent the check-wire from bobbing out through the slot 107 during the reeling operation.

Due to the tension which must be necessarily imposed upon the check-wire during the unreeling operation, a castellated washer and pin, such as 95 and 96, respectively, employed in the reeling operation, may be mounted upon the spindle 31 of the bracket 26 to prevent upward vertical movement of the reel mechanism relative to the spindle, thus preventing disengagement of the teeth 47 of the gear 46 from the projections 34 of the supporting bracket 26.

Thus it will be seen that I have provided a novel reel mechanism capable of being mounted for either reeling or unreeling, and in either case the reel mechanism is adapted to impose a uniform tension upon the check-wire. Also, a novel mounting for a reel mechanism has been provided with which the reel mechanism is adapted to cooperate to permit laying out the check-wire and concurrently planting the first set of rows; a novel securing arrangement for mounting a reel drum upon a reel mechanism of the character described has been provided whereby the reel drum may be reversibly mounted upon the reel mechanism for laying out the wire from either side of the tractor planter; a novel reeling means has been provided whereby the check-wire may be taken up and reeled readily and uniformly; and a novel check-wire guide has been provided whereby the wire may be guided over the front wheel and axle of a tractor and at the same time will permit of sidewise play of the wire for the purpose of obtaining a uniform winding on the reel drum.

While I have shown a preferred embodiment of my invention, I do not wish to be limited thereto.

As will be understood by those skilled in the art, certain changes may be made therein without departing from the essence of the invention or the spirit and scope of the appended claims.

What I claim and desire to secure by Letters Patent is:

1. In combination, a tractor, a reel mechanism support, a propeller shaft journaled in said support, a reel mechanism encircling said support, power operated means journaled on said support and adapted to be rotated with respect thereto by said propeller shaft to operate said reel mechanism for reeling check-wire thereon, and means on said reel mechanism cooperating with said power operated means adapted to maintain a uniform tension on said check-wire in reeling.

2. In combination, a tractor having a frame supported on driving and steering wheels, a reel mechanism support rigidly secured to said frame between said wheels and projecting outwardly with respect thereto, a reel mechanism on said support, power operated means associated with said support and adapted to operate said reel mechanism for reeling check-wire thereon and means fixed on the frame of said tractor and extended over one of said steering wheels and automatically adjustable laterally of the tractor for guiding said check-wire in reeling.

3. A reel mechanism comprising a bearing portion having a flange thereon, a friction plate on said bearing portion adjacent said flange, a hub rotatably mounted on said bearing and engaging said plate at one end and having a flange at the other end, and means on said bearing adapted to exert pressure on said hub thereby exerting pressure on said bearing flange.

4. A revolvable reel mechanism comprising a bearing portion having a flange thereon, a friction plate on said bearing portion adjacent said flange and rotatable therewith, a hub rotatably mounted on said bearing and engaging said plate at one end and having a flange at the other end, and means on said hub flange for securing a reversible reel drum thereto.

5. A revolvable reel mechanism comprising a bearing portion having a flange thereon, a friction plate on said bearing portion adjacent said flange and rotatable therewith, a hub rotatably mounted on said bearing and engaging said plate at one end and having a flange at the other end, means on said bearing portion for pressing the hubs against said friction plate, and means on said hub flange for removably securing a reversible reel drum thereto.

CHARLES H. WHITE.

CERTIFICATE OF CORRECTION.

Patent No. 1,976,314.          October 9, 1934.

CHARLES H. WHITE.

It is hereby certified that error appears in the printed specification of the above numbered patent requiring correction as follows: Page 5, lines 84 and 92, claims 4 and 5 respectively, strike out the word "revolvable" and insert the same to follow the article "a" at the end of said lines; and that the said Letters Patent should be read with these corrections therein that the same may conform to the record of the case in the Patent Office.

Signed and sealed this 30th day of October, A. D. 1934.

Leslie Frazer
Acting Commissioner of Patents.

(Seal)

As will be understood by those skilled in the art, certain changes may be made therein without departing from the essence of the invention or the spirit and scope of the appended claims.

What I claim and desire to secure by Letters Patent is:

1. In combination, a tractor, a reel mechanism support, a propeller shaft journaled in said support, a reel mechanism encircling said support, power operated means journaled on said support and adapted to be rotated with respect thereto by said propeller shaft to operate said reel mechanism for reeling check-wire thereon, and means on said reel mechanism cooperating with said power operated means adapted to maintain a uniform tension on said check-wire in reeling.

2. In combination, a tractor having a frame supported on driving and steering wheels, a reel mechanism support rigidly secured to said frame between said wheels and projecting outwardly with respect thereto, a reel mechanism on said support, power operated means associated with said support and adapted to operate said reel mechanism for reeling check-wire thereon and means fixed on the frame of said tractor and extended over one of said steering wheels and automatically adjustable laterally of the tractor for guiding said check-wire in reeling.

3. A reel mechanism comprising a bearing portion having a flange thereon, a friction plate on said bearing portion adjacent said flange, a hub rotatably mounted on said bearing and engaging said plate at one end and having a flange at the other end, and means on said bearing adapted to exert pressure on said hub thereby exerting pressure on said bearing flange.

4. A revolvable reel mechanism comprising a bearing portion having a flange thereon, a friction plate on said bearing portion adjacent said flange and rotatable therewith, a hub rotatably mounted on said bearing and engaging said plate at one end and having a flange at the other end, and means on said hub flange for securing a reversible reel drum thereto.

5. A revolvable reel mechanism comprising a bearing portion having a flange thereon, a friction plate on said bearing portion adjacent said flange and rotatable therewith, a hub rotatably mounted on said bearing and engaging said plate at one end and having a flange at the other end, means on said bearing portion for pressing the hubs against said friction plate, and means on said hub flange for removably securing a reversible reel drum thereto.

CHARLES H. WHITE.

CERTIFICATE OF CORRECTION.

Patent No. 1,976,314.      October 9, 1934.

CHARLES H. WHITE.

It is hereby certified that error appears in the printed specification of the above numbered patent requiring correction as follows: Page 5, lines 84 and 92, claims 4 and 5 respectively, strike out the word "revolvable" and insert the same to follow the article "a" at the end of said lines; and that the said Letters Patent should be read with these corrections therein that the same may conform to the record of the case in the Patent Office.

Signed and sealed this 30th day of October, A. D. 1934.

Leslie Frazer
Acting Commissioner of Patents.

(Seal)